United States Patent [19]

Sprott et al.

[11] Patent Number: 5,057,024

[45] Date of Patent: Oct. 15, 1991

[54] COMPUTERIZED GLOBE/ALMANAC SYSTEM

[76] Inventors: Glenn C. Sprott; Ruth J. Sprott, both of 10058 Cement Hill Rd., Nevada City, Calif. 95959; Kevin C. Malone, Gin Cove Rd., Perry, Me. 04667

[21] Appl. No.: 236,339

[22] Filed: Aug. 22, 1988

Related U.S. Application Data

[63] Continuation of Ser. No. 892,589, Aug. 1, 1986, abandoned.

[51] Int. Cl.$^5$ .............................................. G09B 27/08
[52] U.S. Cl. ..................................... 434/146; 434/145; 434/136; 434/147; 362/809
[58] Field of Search ................................ 434/130–136, 434/141-149, 153; 364/419, 420; 362/800, 809; 340/286 M

[56] References Cited

U.S. PATENT DOCUMENTS

| | | | |
|---|---|---|---|
| 2,809,448 | 10/1957 | Oestergaard | 434/145 |
| 3,406,312 | 10/1968 | Redman | 434/131 |
| 3,624,648 | 11/1971 | Willoughby | 340/286 M |
| 4,102,121 | 7/1978 | Veazey | 362/809 |
| 4,338,547 | 7/1982 | McCaslim | 362/800 |
| 4,449,941 | 5/1984 | McGuire | 434/153 |
| 4,451,874 | 5/1984 | Friedman | 362/809 |
| 4,494,935 | 1/1985 | Miller . | |

FOREIGN PATENT DOCUMENTS

| | | | |
|---|---|---|---|
| 3036341 | 5/1982 | Fed. Rep. of Germany | 439/149 |
| 0057157 | 8/1982 | Fed. Rep. of Germany | 434/130 |
| 187018 | 12/1963 | Sweden . | |

OTHER PUBLICATIONS

"Computer Atlas Puts Globe on Disk"; Sandberg-Diment, NY Times, 3/18/86.
Amatear Electronic Supply Catalogue; "World Clock"; 1986.

Primary Examiner—Edward M. Coven
Assistant Examiner—Mark S. Graham
Attorney, Agent, or Firm—Philip A. Dalton

[57] ABSTRACT

A computer controlled illuminated globe almanac is disclosed for rotating the globe to a selected viewing position and illuminating selected points, lines and areas on the globe. The system also displays and/or prints associated almanac-type data such as, for example, city or country name and population, river name an length, etc.

6 Claims, 11 Drawing Sheets

INITIALIZATION ROUTINE.
151

START SUBROUTINE.

DETERMINE SYSTEM CONFIGURATION AND OPERATIONAL READY STATUS. CHECK GLOBE SERIAL NUMBER CODES.

IS SYSTEM READY?

START GLOBE ROTATING AND LOCATE ZERO POSITION. SET LEDS TO INITIAL STATUS.

IS GLOBE SET.?

SET ALL PROGRAM VARIABLES TO INITIAL STATUS. ("DATFLAG" = "WORLD") ("OPFLAG" = "DMS")

GO TO MENU DRIVER SUBROUTINE 152. (FIG. 14)

DISPLAY ERROR MESSAGES BASED ON ERRORS DETECTED.

SEE FIG. 14-1

SELECT ALMANAC DATA Y/N?

GO TO ALMANAC DATA SUBROUTINE 155 (FIG. 17)

"OPFLAG" = "EXIT"
END PROGRAM EXECUTION AND RETURN TO OPERATING SYSTEM.

FIG. 14-2

SELECT MAP FOR DISPLAY SUBROUTINE 153

START SUBROUTINE.

DISPLAY ("DATFLAG".MSS) MAP SELECTION SCREEN TO MONITOR AND ASK USER TO SELECT MAP FOR DISPLAY.

SET "DATFLAG" TO REFLECT MAP CHOICE. SET "OPFLAG" TO = "DMS" (DISPLAY MAP TO SCREEN).

RETURN TO MENU DRIVER SUBROUTINE 152 (FIG. 14)

FIG. 15

DISPLAY MAP SUBROUTINE
154

START SUBROUTINE.

READ MOTOR POSITIONING DATA IN "DATFLAG".GLO FILE AND SEND TO MOTOR CIRCUIT WITH EXECUTE CODE.

READ LED DISPLAY DATA IN "DATFLAG".GLO FILE AND SEND TO LED CONTROL CIRCUITS.

READ SPEECH SYNTHESIS DATA IN "DATFLAG".VOC FILE AND SEND TO SPEECH SYNTHESIZER CIRCUIT WITH EXECUTE CODE

DISPLAY "DATFLAG".MSI (MAP SCREEN IMAGE FILE) TO MONITOR SCREEN. REQUEST USER SELECT NEXT OPERATION (SM, DIS OR EXIT).

SET "OPFLAG" TO REFLECT USER INPUT.

RETURN TO MENU DRIVER SUBROUTINE AT ENTRY POINT "A" 178 (FIG.14)

FIG.-16

DISPLAY ALMANAC DATA SUBROUTINE
155

START SUBROUTINE.

DISPLAY ("DATFLAG" ALM) SCREEN TO MONITOR AND ASK USER TO SELECT CHOICE.

IS CHOICE VIEW NEXT PAGE OF ALMANAC DATA (IF AVAILABLE) Y/N?

IS CHOICE PRINT OUT ALMANAC DATA Y/N?

PRINT OUT DATA IN CURRENT "DATFLAG" ALM FILE.

SET "OPFLAG" TO = "DMS".

RETURN TO MDS SUBROUTINE ENTRY POINT "A" 178 (FIG. 14)

FIG-17

COMPUTERIZED GLOBE/ALMANAC SYSTEM

This is a continuation of application Ser. No. 892,589 filed Aug. 1, 1986 abandoned.

BACKGROUND OF THE INVENTION

The present invention relates to illuminated globes and, in particular, to a globe which is controlled by a computer and is selectively illuminated so that the globe can be rotated to a selected viewing position and points such as cities and areas such as countries and other geographical or political areas illuminated.

As discussed below, various types of illuminated globe or almanac displays are available in the art. For example, U.S. Pat. No. 2,809,448 to Oestergaard discloses a rotatable globe in which the wires for the single internal illumination source are routed through the axial mounting shaft. Also, U.S. Pat. No. 3,624,648 to Willoughby discloses an annunciator system having a graphic display panel for providing an illuminated display of various conditions within a plant, rather than political or geographic information associated with the earth. U.S. Pat. No. 4,449,941 to McGuire discloses an educational device having a map of the U.S. which is selectively lighted by internal lamps by inserting different control cards.

An article in the Tuesday, Mar. 18, 1986, issue of the New York Times, in the personal computer's section, discussed the apparently recent availability of software programs for displaying global or almanac-type information.

Finally, the Amateur Electronic Supply, Fall 1984, catalog shows a world clock available from ICOM America which contains an illuminated globe. Apparently, the globe is rotated manually and the rotational position controls the illumination of one of twenty-four LED's at selected city locations along with the corresponding local time.

As is evident from the above discussion, despite the availability of various types of illuminated globe and almanac informational systems, to our knowledge there has not been made available a system which is capable of effecting the rotation of a globe to a selected viewing location and concurrently illuminating selected geographical or political points or areas and providing almanac-type information associated with that area such as name, population and other data.

SUMMARY OF THE INVENTION

In view of the above discussion, it is a primary object of the present invention to provide a globe almanac system which is capable of effecting the rotation of the globe to a selected viewing location and concurrently illuminating selected geographical or political points or areas and providing almanac-type information associated with that area such as name, population and other data.

In one aspect, our present invention which provides the above and other objects is a computer-controlled globe almanac system which includes a globe; a motor system for rotating the globe to a selected viewing orientation; inserts in the surface of the globe which define various geographical and political points and regions; and means for illuminating the selected points and regions without cross-illumination adjacent such points and regions.

In addition, our system includes computer means for controlling the selected rotation and illumination, as well as for effecting the display or other read-out of almanac-type information associated with the selected illuminated areas or regions.

BRIEF DESCRIPTION OF THE DRAWINGS

The above and other aspects of our present invention are disclosed in the drawings in which:

FIGS. 12 through 17 are flow charts which summarize the computer controlled operation of our illuminated computer controlled globe/almanac system.

DETAILED DESCRIPTION OF THE INVENTION

Overall System

Figure 1:
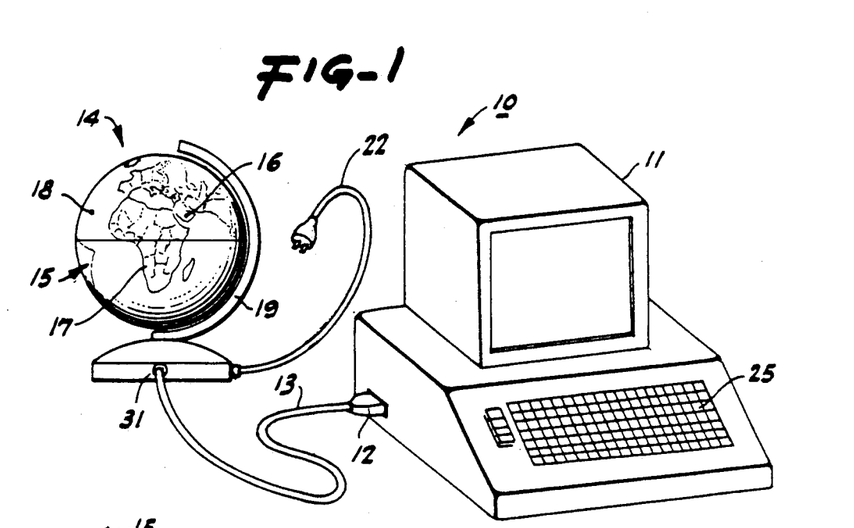
FIG. 1 is a simplified schematic representation of a preferred embodiment of our computer-controlled globe/almanac system.

FIG. 1 is a simplified schematic representation of a preferred embodiment 10 of our computer-controlled globe/almanac system. Preferably, a micro-computer or personal computer 11 is connected to a globe system 14 for controlling the rotation and selective illumination of the globe. Serial communications port 12 of the computer 11 is connected via interface cable 13 to the globe to permit bi-directional communication between the computer and the globe.

In the presently preferred embodiment, computer 11 is a personal computer such as an IBM/PC with keyboard 25 and the port 12 is the associated RS-232 asynchronous serial port. The RS-232 interface is a conventional system that establishes a standard that includes the mechanical, electrical and functional characteristics of the interface. The pin-out of the DB-25 connector 31 (FIG. 2) used for the RS-232 serial port is standardized so that all computers possessing this port can be connected to a single version of the globe display control electronics using a standard interface cable 13.

Alternatively, the control computer unit 11 could be implemented as a dedicated microprocessor.

As illustrated in FIG. 1, the globe system 14 includes a spherical world globe 15 which is selectively illuminated at points of interest 16 such as cities or capital cities, and at other areas such as countries 17 and oceans or other bodies of water 18. In addition, illumination can be used to highlight other geographical features such as rivers and mountain ranges as well as other points or areas of interest

Globe System 14

Figures 2, 8:
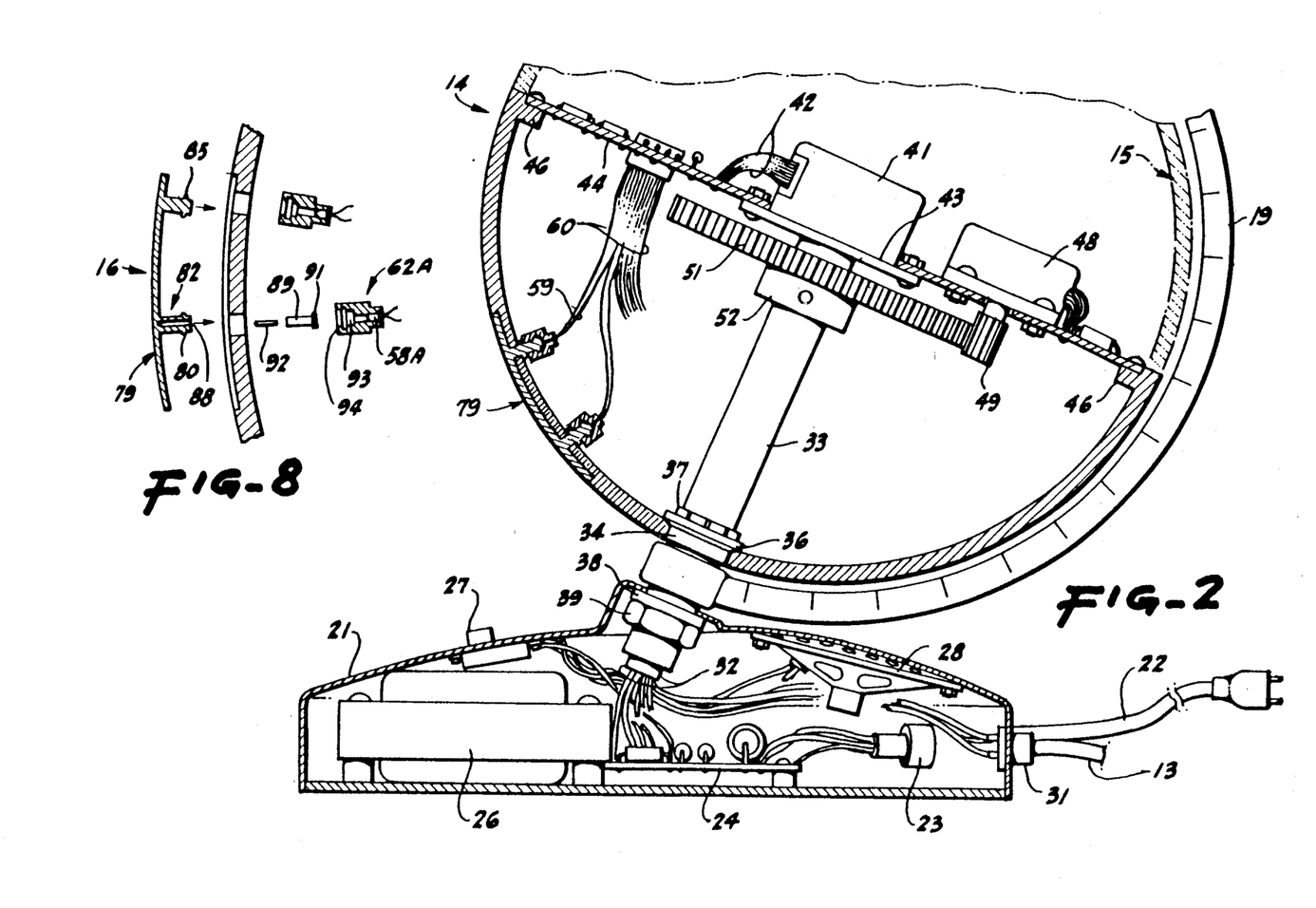
FIG. 2 is a vertical sectional view through the globe of FIG. 1 illustrating the details of the components and their construction.
FIG. 8 discloses a presently preferred system for mounting and illuminating points and surrounding areas without cross-illumination.

FIG. 2 is a vertical sectional view through globe system 14 of FIG. 1 illustrating the details of the components and their construction.

Globe system 14 comprises a base or housing 21 that includes a power cord 22 that feeds through a strain arrester 23 and connects to a conventional power supply circuit board 24 and step-down power transformer 26. The power is controlled by an on/off switch 27. Also, a speaker 28 may be used to provide an audible description of selected global points of interest.

The RS-232 interface cable 13 is connected into the base via connector 31 which, as mentioned, preferably is a DB-25.

The various power and control leads, which are grouped as cable 32, are routed into the globe 15 via the hollow main support tube or shaft 33. This tube 33 extends through a hole formed through the south polar axis of the globe 15 and through a bore formed in the support arm 19. Bearing 34 permits rotation of the globe relative to the support arm and tube. The globe and support arm are retained on the support tube 33 by a washer 36 and retainer nut 37 threaded on the tube 3 on the inside of the globe. The tube is mounted to the base 21 by a washer 38 and lock nut 39 threaded on the end of the tube within the base 21.

The individual conductors of cable 32 are connected to a slip ring assembly 41 which provides electrical contact to the components mounted within the rotating globe 15, e.g., via conductors 42 to printed circuit board 44, and prevents rotation of the cable 32 itself. The slip ring assembly 41 includes an internal bearing (not shown) which is mounted over the upper end of the support tube 33. Peripheral flange 43 is mounted to peripheral support printed circuit board 44, which in turn is fastened to mounting bosses 46 formed at the internal periphery of the globe 15. In this manner, the upper bearing contained in the slip ring assembly 41 and the lower bearing 34 provide stable rotational support for the globe 15 and eliminate the necessity of extending the shaft 33 to the north polar region. Alternatively, a "pancake"-type slip ring could be used, to enable the tubular main support tube 33 to pass completely through the slip ring.

As mentioned, support plate 44 can be a printed circuit board. The board can be circular, or rectangular with rounded ends to conform to the inner radius of the sphere 15. The final choice of PC board configuration in a particular application will depend upon the features of the application and the associated circuitry required to implement that operating configuration. Additional printed circuit boards can be mounted on stand-offs on the main board 44 for connection to these appropriate circuits with ribbon or other types of connectors if desired.

Attachment of the printed circuit board 44 to the bosses 46 and to the body flange 43 of slip ring assembly 41 incorporates it as an integral structural support member which mounts the second bearing as well as the electronic mounting means. Alternatively, a bracket or plate of metal or the like could be used as the support member in place of the printed circuit board 44, in which case the control electronics printed circuit board(s) could be mounted on the support 44 with stand-offs to isolate the printed circuit board from potential mechanical stress. The slip ring assembly 41 and stepping motor 48 could then be mounted directly to the metal bracket 44, thereby eliminating any mechanical stress on the printed circuit board.

Preferably, rotation of the globe 15 is effected by a stepping motor 48 that is mounted on the printed circuit board/support plate 44. The motor drive shaft mounts a pinion gear 49 which drivingly engages a spur gear 51 having its gear hub 52 mounted on the globe support tube 33. In this manner, reversible operation of the stepping motor 48 imparts precisely controlled, bidirectional rotation of globe 15 as discussed below.

One constructional embodiment of the globe itself is based upon an unilluminated world globe of the type available from a number of commercial sources. In this embodiment, illuminated points of interest 16 such as cities and the like are provided by drilling holes at the selected locations and mounting LED's (light emitting diodes) at each location Typically, drilling fixtures constructed with a multiplicity of precisely located drill guide sleeves can be used to guide drill bits at each drill guide or the globe can be attached to a platform fixture mounted on a numerically controlled drilling machine programmed to locate and drill the appropriate points.

Figures 3, 4, 5, 6, 7:
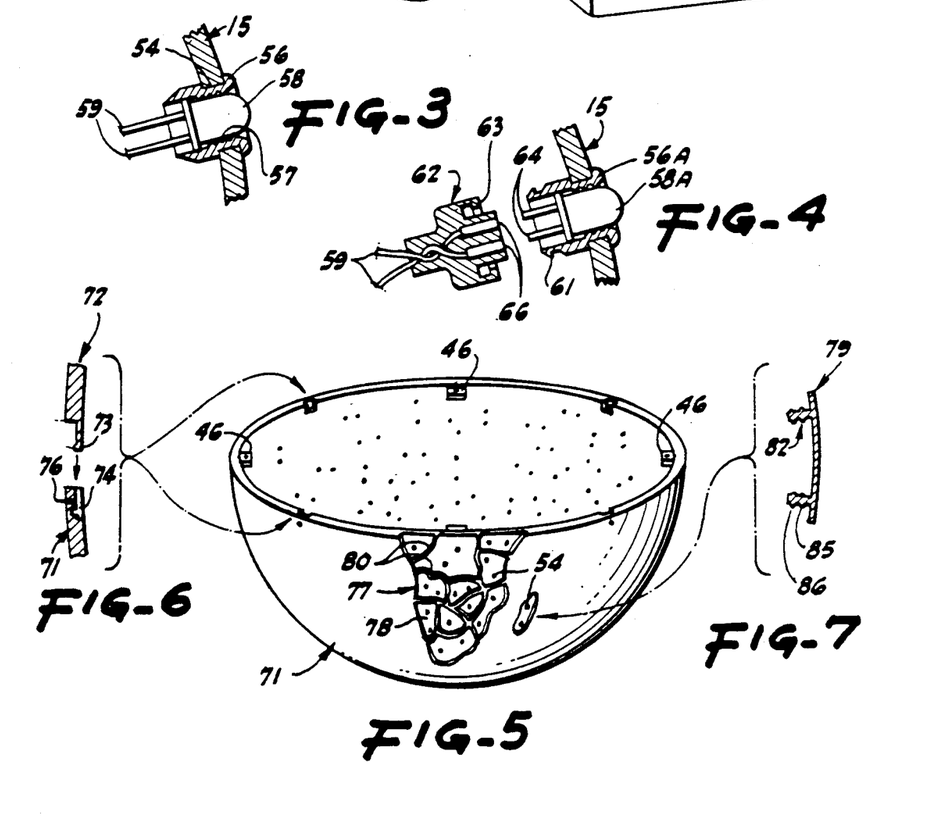
FIGS. 3 and 4 illustrate two of the disclosed approaches for mounting and connecting LED's within the globe.
FIG. 5 is a perspective view of one hemisphere of a preferred embodiment of the globe.
FIG. 6 is an enlarged partial view showing one approach for attaching the mating hemispheres with the globe.
FIG. 7 illustrates the construction of an illuminated section of the globe which defines a political or geographical or other area such as a country.

FIGS. 3 and 4 illustrate two approaches for attaching LED's to drilled holes 54 in the globe 15.

The first approach, shown in FIG. 3, uses resilient press-fit bushings 56 which are inserted into holes 54. Each bushing 56 has a serrated internal bore 57 for releasably gripping LED 58. The associated wiring leads 59 are part of bus or cable 60, FIG. 2, which is connected to the control electronic printed circuit board 44 for connection via cable 42, slip ring assembly 41 and cable 32 to the power supply circuit in the base 21 and through cable 13 to the control computer 11.

Alternatively, referring to FIG. 4, a combined bushing/electrical connector assembly can be used. Here, bushing 56A is formed with an external barbed end 61. The LED 58A includes electrical connectors 64 which are connected to mating sockets 66 in the electrical connector 62. The electrical connector 62 is retained on the bushing 56A by a retaining ring 63 which engages the bushing barb 61 with a resilient snap fit. External connection is provided by the socket wiring 59.

Alternatively, the LED's such as 58 or 58A can be mounted on the circuit board 44 and the wiring replaced by fiber optic filaments (not shown) which connect to the holes 54 in the globe. Retainers (not shown) for the fiber optic filaments are formed from either clear or colored, transparent or translucent plastic and are inserted into the globe from the outside in a manner similar to the way in which the LED's 58 and 58A are inserted in FIGS. 3 and 4.

Presently Preferred Globe

FIGS. 5 through 7 disclose a presently preferred embodiment of the globe 15 which contains both illuminated points and illuminated areas.

FIG. 5 illustrates one hemisphere 71 of a presently preferred molded (typically injection molded) embodiment of the globe 15. The two hemispheres 71 and 72 (FIG. 6) and the LED mounting holes 54 and other features are formed as part of the molding operation. Preferably, the molded hemispheres 71 and 72 are formed from opaque ocean blue plastic with depressed features representing the land masses. The raised features are molded with an appropriate surface finish to facilitate printing.

FIG. 6 is an enlarged partial view of one approach for attaching the mating hemispheres 71 and 72 of the globe. The hemispheres 71 and 72 are attached by a series of snap fasteners 73 and receptacles 74 which are positioned to avoid LED areas and which provide quick assembly and disassembly of the hemispheres in a fixed positional relationship. The accepting fasteners 74 are each equipped with a small access hole 76 to enable the insertion of a pin or the like to release associated fastener 73. Also, as shown in FIG. 5, a number of the brackets or bosses 46 are molded to the interior of the hemispheres at or about the equator for mounting the printed circuit board/support plate 44.

As disclosed in FIG. 5, the molded globe embodiment allows the display of illuminated areas as well as, or instead of, illuminated points. The outline shapes of political and geographical areas or regions such as continents 77, countries 78 and islands 79 are typically deeply depressed into the outside surface 81 (not shown in FIGS. 5 or 7) of the hemispheres. Also, borders between regions such as countries and states can be formed as thin walls 80 that are left full height relative to the depressed areas to delineate the various regions. The depressed regions can be printed with a hot stamping process using contoured dies with highly reflective foil, or electro-plated using masks to delineate areas to be metallized with reflective coating to increase the amount of light at each display area.

As shown in FIG. 7, the individual geographical or political regions such as continents 77, countries 78 and islands 79 are molded from clear or colored transparent or translucent plastic and inserted into the corresponding depressions. For example, the raised or depressed features represent geographical or political features such as mountain ranges, borders or latitude and longitude division lines. Each individual plastic piece such as 79, FIG. 7, is equipped with one or more combination retainer post/LED mounting posts 82 molded integrally on the inner concave face 83 at appropriate points which are aligned with the preformed holes 54. Of course, additional non-LED mounting posts (not shown) may be used if necessary. Application of a reflective coating of silver or the like applied to the rear 83 of each piece 77-79 in lieu of the previously described hot stamping or electro-plating process would enhance the amount of light reflected for such regions.

Alternatively, in a modular approach, the raised borders 80 can be eliminated so that the political inserts such as countries can be changed to reflect changes in borders, countries, etc.

Typically, each of the integral retainer posts 82 (not shown in FIG. 7) is equipped with dual barbs 85 and 86 so that a mating LED 58A (FIG. 8) can be inserted into the post. Electrical connection can be made thereto by a connector such as 62A, FIG. 8. The barbs 85-85 secure the piece such as 79 to the globe. The barbs 86-86 mount the LED holder 62-A to posts 82, which allow light to enter each piece such as 79 from the rear to illuminate the entire piece. Each piece such as 79 is sized to mount within its associated globe depression to provide a flush fit with the outer surface of the globe.

FIG. 8 discloses additional internal details of one embodiment of the insert construction of FIG. 7. Cities or other individual points 16 (FIG. 1) can be selectively illuminated within illuminated areas such as 77, 78 or 79 by forming the post 82 with a hole 88 through the center of the post ending, just below the surface of the piece. An opaque black tubular insert 89, which has a flange 91 at one end, and a transparent rod light pipe 92 are assembled and pressed into the bore 88 from the interior of the hemisphere. The tubular insert 89 channels light from LED 58A without allowing the light to diffuse into the body of the country/state insert 79. The LED 58 itself is mounted in a stepped hole or bore 93 in holder/connector 62A. The rear flange 91 of the tubular insert and the retaining rim 94 of connector 2A seal the connection and prevent extraneous light from entering the mounting post.

A primary advantage of this preferred embodiment of the globe is its appealing colored contoured surface and the ability to light selected geographical areas as well as individual points using various colors and of providing different colored illumination of selected points within illuminated areas.

Additional Globe Embodiments

An alternative embodiment of the globe 15 comprises outer printed translucent colored hemispheres, as described above, and inner copper-clad hemispheric printed circuit boards (not shown). The hemispheres are photo-etched and all the necessary wiring circuits are formed on their inner surfaces. Each LED position is defined by connections on the inner and outer surface of the printed circuit board hemisphere. The LED's are inserted into through-holes formed in the hemispheres and soldered to copper conductors surrounding the holes. Quite obviously, this approach eliminates potentially bulky wiring within the globe in that it requires only connections between the printed circuit board and the electronics board 44. Also, this approach eliminates the need to mount LED's on or in the outer hemispheres.

In another alternative embodiment, the LED's could be supplemented by photo-detectors (not shown). The photo-detectors provide input signals to the computer 11 for controlling, for example, the illumination of display LED's in the selected area. The input signals are provided by directing illumination such as that from a pencil flashlight at a particular photo-detector.

Alternatively, commercially available optical switches which combine an LED and a photo-detector in the same package can be mounted at selected points and used to provide an input signal to the computer for illuminating selected points, areas or the like. In this case, the input is provided by placing a reflective object such as a finger adjacent the LED and photo-detector to enable the photo-detector's reception of illumination from the LED.

In still another alternative approach, capacitive threshold switches or thin film switches can be used as input devices for effecting the illumination of selected points or areas.

Globe Rotation and Reference Position Detection

As mentioned, and referring initially to FIG. 2, in a preferred embodiment, the globe system 14 is rotated by a stepping motor 48 mounted on PC board or support plate 44 so that pinion shaft 49 rotates around the spur gear 51 that is mounted on the stationary axial support tube 33. Such stepping motors are intrinsically able to rotate in either direction dependent on the sequence of the excitation of the field windings. In turn, this sequence is determined by a control code passed to the stepping motor controller chip 131 (FIG. 11) in the electronics module 100 shown in FIGS. 9–11. The control code comprises a high bit (positive current) or low bit (negative current) passed to the appropriate location on the (transistor-transistor logic) TTL data bus 113. When bi-directional rotation is used, the operating system program incorporates an algorithm to determine the direction to be taken utilizing the least number of steps from the current position of the globe to the next programmed globe position The globe 15 rotates automatically under program control based upon input from a zero position indicating switch 134 (FIG. 11) which locates a zero or null point for data reference purposes, i.e., for program control purposes. The zero position switch 134 is a microswitch mounted on the printed circuit board 44 so that a small pin (not shown) projecting from spur gear 51 activates this switch during rotation. Alternatively, the switch can be incorporated into the slip ring assembly by simply breaking one of the slip ring contacts on a point on its diameter so that contact is broken with the ring contacting brush as the brush rotates over that point.

In operation, typically the control program initializes the globe in the rotating mode for sensing the zero reference position based upon the pin tripping the micro switch. Once the zero position has been detected, the program controls rotation of the globe to the selected position determined by simply specifying the appropriate number of steps required by the motor to reach the desired position. A program reference variable is stored in the computer memory to indicate the globe's position on a continuous basis.

Optionally, a position encoding device such as a rotary optical encoder can be incorporated into the globe for constant monitoring of the position of the globe. The encoder would require an additional electronic counter circuit in the computer to constantly monitor the encoder and maintain a reference value that is periodically sampled by the program.

Another, inexpensive, positional tracking approach uses two identical stepping motors, one to actuate the rotation as described and the other to function as the encoder. Stepping motors generate minute electrical pulses when rotated manually, much in the manner of a generator. Consequently, the pulses of the encoder/rotating motor could be detected by appropriate circuitry and used to provide positional data in the same manner as the optical encoder described above.

In still another position encoding approach, the slip ring assembly could be equipped with an encoding ring that operates like a rotary switch, thus eliminating the need for an additional discrete device. Monitoring of this encoding ring switch is accomplished similarly to the other position tracking approaches.

Control Electronics

Figure 9:
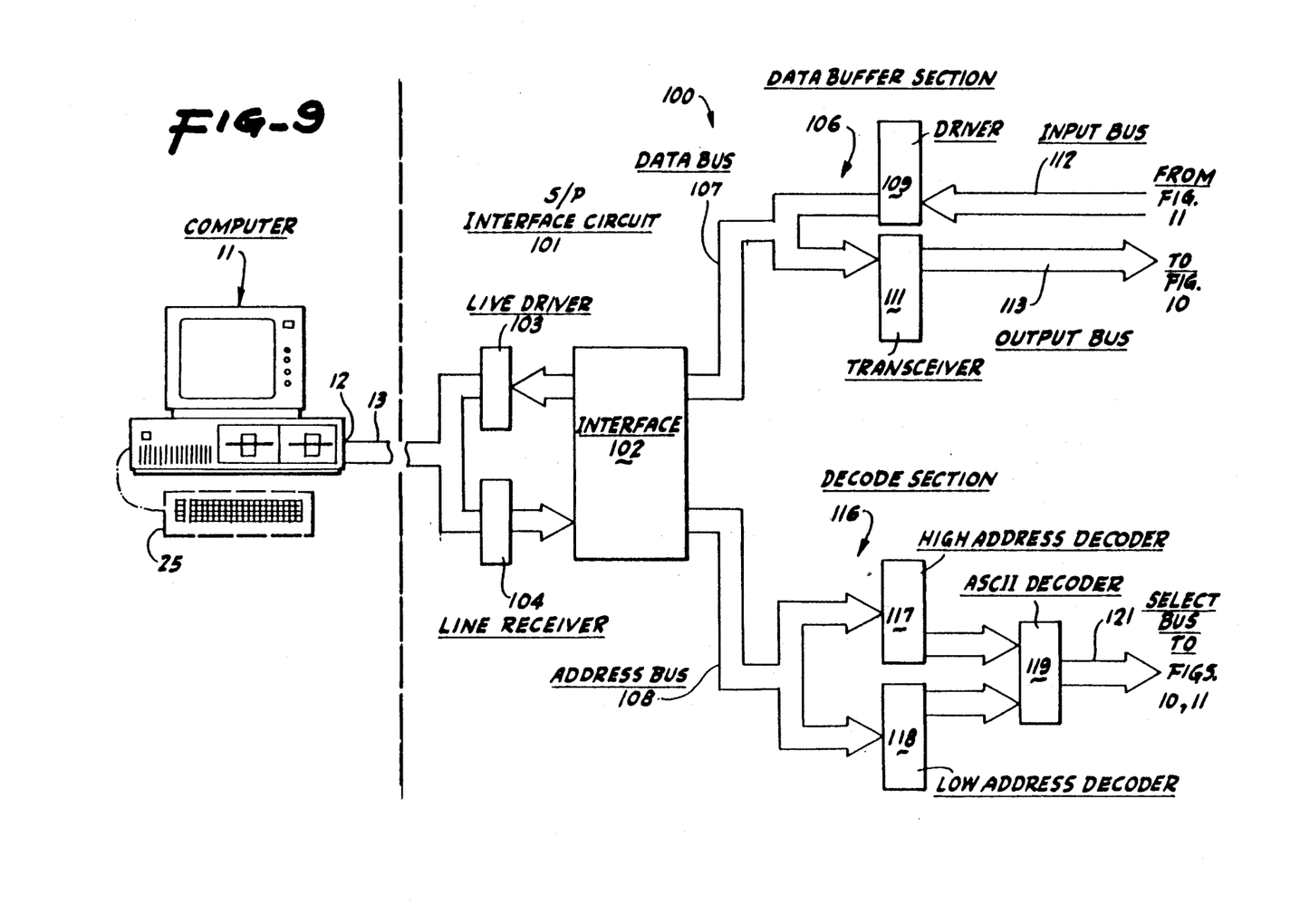
FIG. 9 depicts an electronic control circuit for our globe system.
Figure 10:
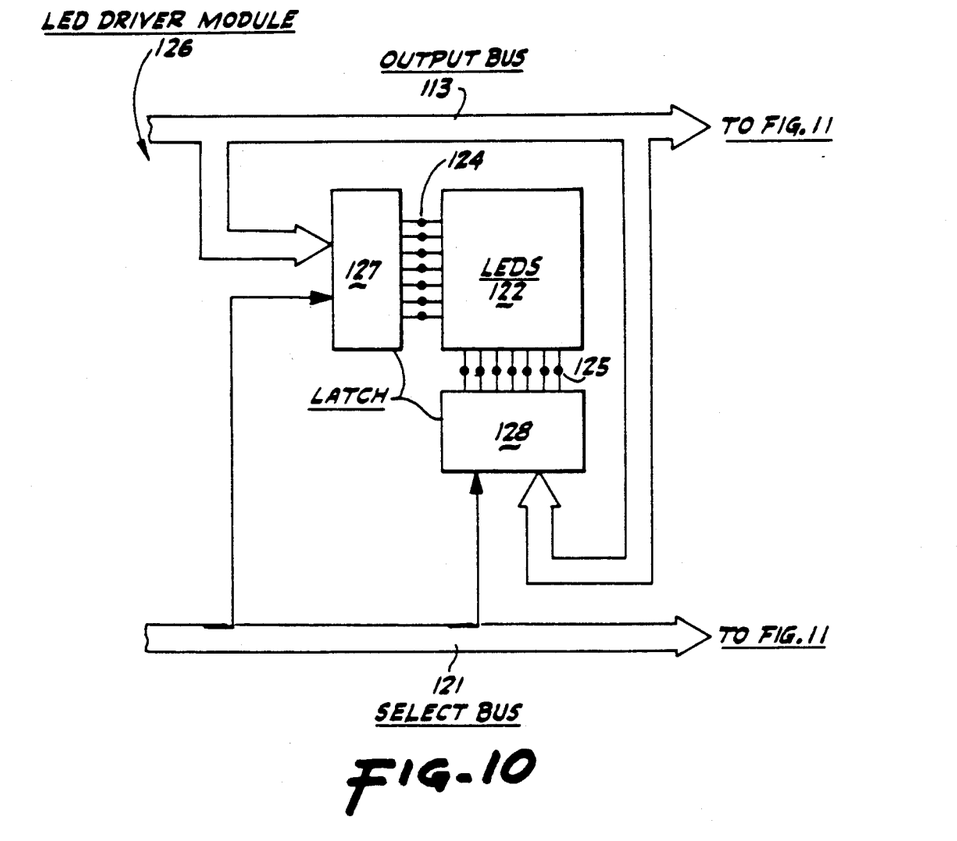
FIG. 10 schematically illustrates an LED driver module of the electronic control circuit.
Figure 11:
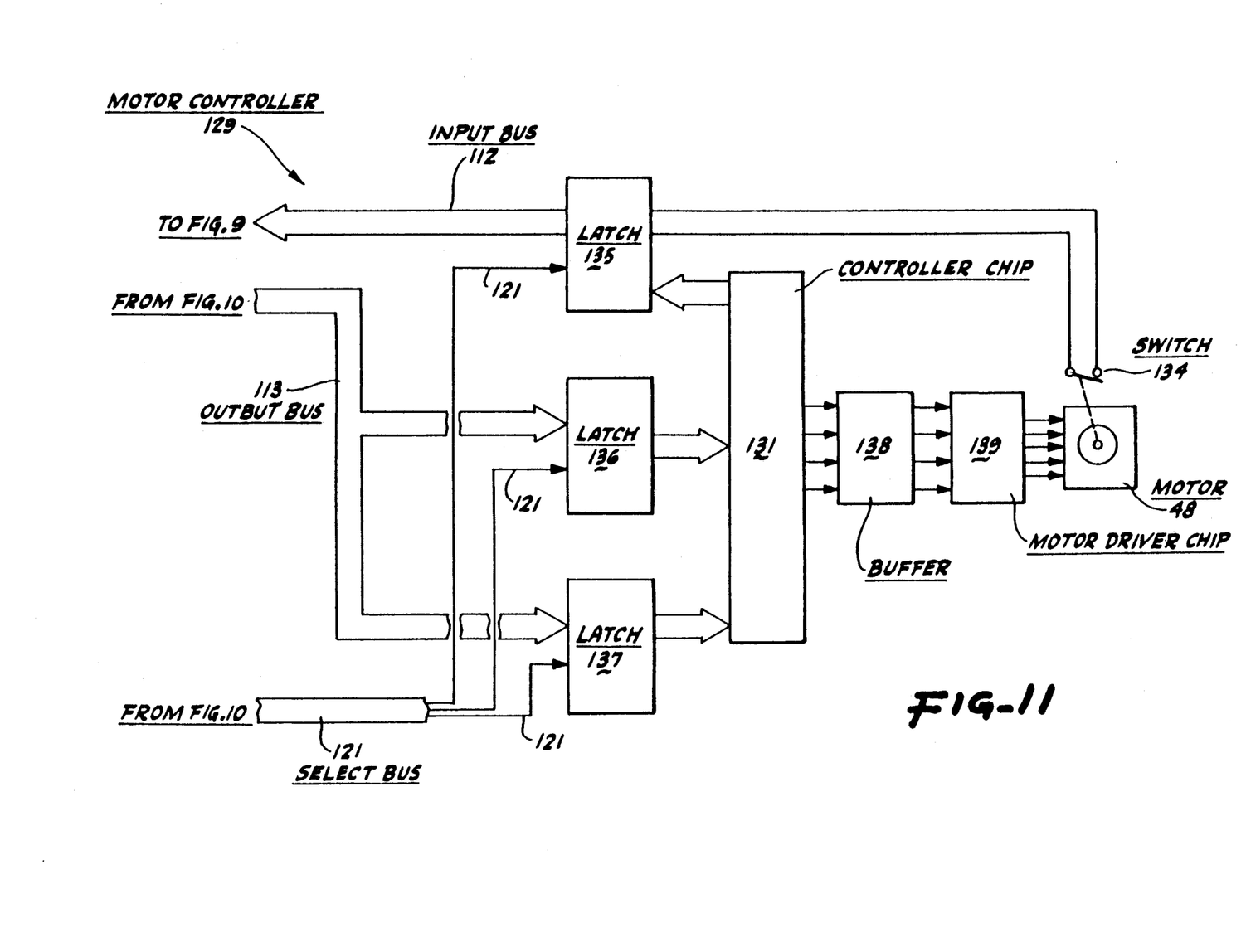
FIG. 11 is a block diagram schematically depicting the stepper motor and an associated stepper motor control of the electronic control circuit.

FIGS. 9–11 depict an electronic control circuit 100 which communicates via the RS-232 serial interface 12 with the personal computer 11. The electronic control circuit 100 serves two main functions: control of the globe's array 122 of LED's 58 (FIG. 10), and the control of a motor controller module 129 (FIG. 11).

The control circuit 100 operates in the parallel mode internally. The serial/parallel and parallel/serial conversions which are required because of the parallel internal operation and the serial port 12, are accomplished through serial/parallel interface circuit 101.

This circuit comprises a serial/parallel interface device 102 which drives line driver 103 and is also connected to a line receiver 104. The line driver and line receiver in turn communicate with the personal computer through the RS-232 serial interface 12. The serial/parallel interface device 102 can be a CY-232 LSI chip, which has the ability to transmit and receive simultaneously (full duplex mode) and can address up to 256 parallel devices. The line driver 103 can be an MC-1488 quad line driver, whereas the receiver 104 can be an MC-1489 quad line receiver. The line driver 103 and line receiver 104 convert the incoming and outgoing signals between the serial/parallel interface device 102 and the computer's RC-232 port 12 to and from TTL (Transistor-Transistor Logic) and EIA RS-232-C standard logic formats.

The serial/parallel interface device 102 is connected via data bus 107 and address bus 108 to buffer section 106 and decoder section 116, respectively. Specifically, the data bus 107 is buffered through the buffer section 106, which enables the bi-directional data flow within the control circuit 100. The data buffering of section 106 is provided by a line driver 109 and a transceiver such as, for example, a 74 LS-242 octal buffer/line driver 109 and a 74 LS-243 octal bus/transceiver 111. The two chips 109 and 111 allow data to be read from or written to the CY-232's data bus 107. During the proper time for writing incoming information to the data bus, the bus/transceiver 111 allows the data to be sent to all of the controlled devices (such as LED's 58 and stepper motor 48), while buffer/line driver 109 in a similar manner provides data returning from a specifically selected device. These two chips 109 and 111 act as control windows between the CY-232 data bus 107 and the system input bus 112 and the system output bus 113, allowing the bi-directional data bus 107 data to be unidirectionally transferred from the input data bus 112 or to the output data bus 113.

Address bus 108 from the serial/parallel interface device 102 is decoded through decode section 116, which contains HIGH address decoder 117, LOW address decoder 118 and ASCII decoder 119 for supplying individual select lines for each control device. The signals from the decoder section 116 determine which device is actively receiving data from or supplying data to the buffer data buses 112 and 113.

Specifically, the address bus 108 supplies eight binary code inputs (one byte) to decode section 116 where the byte input is decoded by the address decoder by way of the HIGH address decoder 117 and the LOW address decoder 118 supplying the appropriate logic to the ASCII address decoder 119, which selects the individual select lines 121. The HIGH address decoder 117 examines the four most significant bits of the input signal byte from the address bus 108 and the LOW address decoder 118 examines the four least significant bits of the input signal byte. The HIGH and LOW address decoders each supply the ASCII decoder 119 with half of the data used to construct the character to select the appropriate individual line of the select lines 121. Combination signals from the HIGH and LOW address decoders are processed by the ASCII decoder 119 and at the appropriate time are applied by an individual select line of bus 121 (going to the logically true state, +,) to the appropriate selected device. The CY-232 interface device 102 is able to address up to 256 select lines 121 in this manner by using this decoding approach.

Referring to FIG. 10, there is schematically illustrated an LED driver module 126 comprising a "matrix" 122 of light emitting diodes 58, and two, row and column latch arrays 127 and 128. The LED matrix 122 comprises, for example, a 7×7 m×m "array" of individual light emitting diodes such as 58 which are mounted in the globe 15 as described earlier. For address purposes, the LED's are considered to form a Cartesian (xy) coordinate pattern or array. Supplying the appropriate row and column pins 124 and 125 of the matrix with a logic one or logic zero illuminates one or more of the LED's. Each latch array 127 and 128 stores the data in binary form supplied from the data line 113, which represents the appropriate Cartesian xy coordinate and activates the row and column pins 124 and 125 which determine the appropriate LED or LED's 58 to be illuminated. The device select lines 121 enable the data to be stored in the latches 127 and 128, where it is held until another selection is made. The LED's 58-58 respond immediately as the latches are set. As one example, the latch arrays 127 and 128 can each be 8212 eight bit input, Schottky latch arrays.

FIG. 11 is a block diagram schematically depicting the stepper motor 48 and the associated stepper motor control circuit 129. The primary component of the control circuit 129 is a stored program stepper motor controller chip 131 for operating in two modes: direct computer program control and stored program control modes. This chip 131 can function under direct software control or the software can load a sequence of control instructions into a storage area within the chip itself. In the illustrated system, the motor controller chip 131 such as, for example, the CY-500 stepper motor control chip, is operated by a series of three latches 135, 136 and 137, such as 8218 latch arrays, and is interfaced to the stepper motor 48 through a buffer 138 such as, for example, a 74 LS04 hex inverter buffer. The buffer supplies control signals to a motor driver chip 139 such as, for example, a ULN-2068-B high current, high voltage Darlington array motor driver chip.

The particular stepper motor control device or chip 131 is capable of operating in two modes: a direct computer program control mode and a stored program control mode. The chip can function under direct software control or the software can "load" a sequence of control instructions into a program instruction storage area present in the chip. The stepper motor controller chip is provided with data and addressed in much the same manner as the LED matrix 122. The motor control module 129 is equipped with a data transmitting circuit comprising zero position switch 134 and latch array 135 which enables the controlling software to monitor the position of the motor 48 during operation. In operation, the zero position indicator switch 134 sends a signal to the 8218 latch array 135 and the signal is returned via the input data bus 112 to the buffer/line driver 109 and then via the data bus 107 to the CY-232 interface device 102.

The stepper motor controller 131 is configured to enable the control of a four phase stepper motor 48. The controller 131 enables the control of direction, position, speed and acceleration through the appropriate commands latched into the 82-12 latches 136 and 137 or loaded into the internal chip memory section through an appropriate series of commands delivered to the 8212 latches 136 and 137, via output data bus 113 and individual select lines 121. As mentioned, the control chip in turn is interfaced by hex inverter buffer 138 and motor driver chip 139 to the stepper motor 48 for implementing the selected commands.

A series of control lines (not shown, for clarity) from the CY-232 serial/parallel interface 102 determine the timing of the execution of latch commands for all devices. The lines used are WRITE, READ and DATA AVAILABLE (not shown). Also, a controlled power supply 24, 26 (FIG. 2) provides current to all of the devices and controlled components. The power lines are shown in FIG. 2 but are not shown, for example, in FIGS. 9 through 11, for clarity.

Various additional embodiments and modifications will be readily implemented by those of usual skill in the art. For example, voice synthesis may be added to provide computer-controlled vocal almanac information about selected regions, cities, etc. Also, voice recognition capability may be used as input.

System Operation

FIGS. 12 through 17 are flow charts which summarize the computer controlled operation of this system in selecting and implementing (1) rotation of the globe 15 to selected positions relative to the zero reference point for viewing and (2) illumination of selected geographical and political areas and points for viewing at the selected position. As noted previously, the globe and LED's are interfaced to permit illumination of the selected area(s) and point(s) without cross-illumination of adjacent points or areas.

Figure 15:
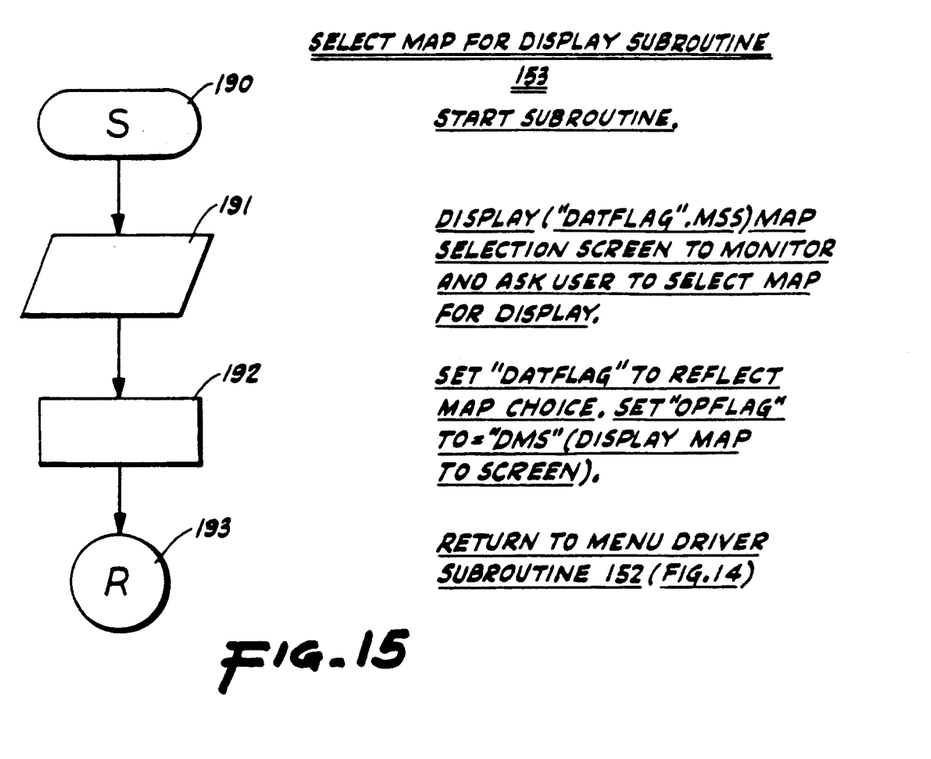
Figure 16:
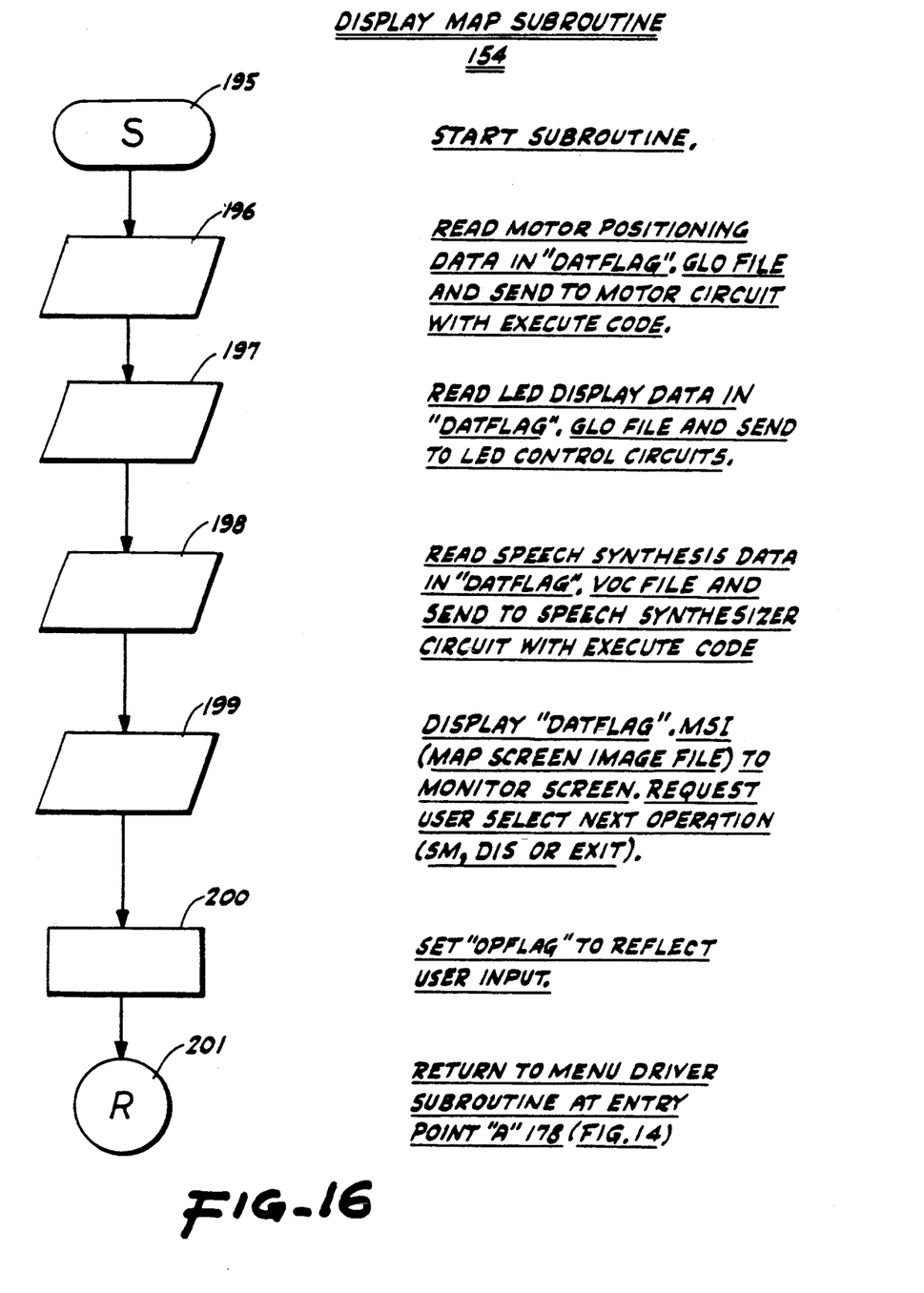
Figure 17:
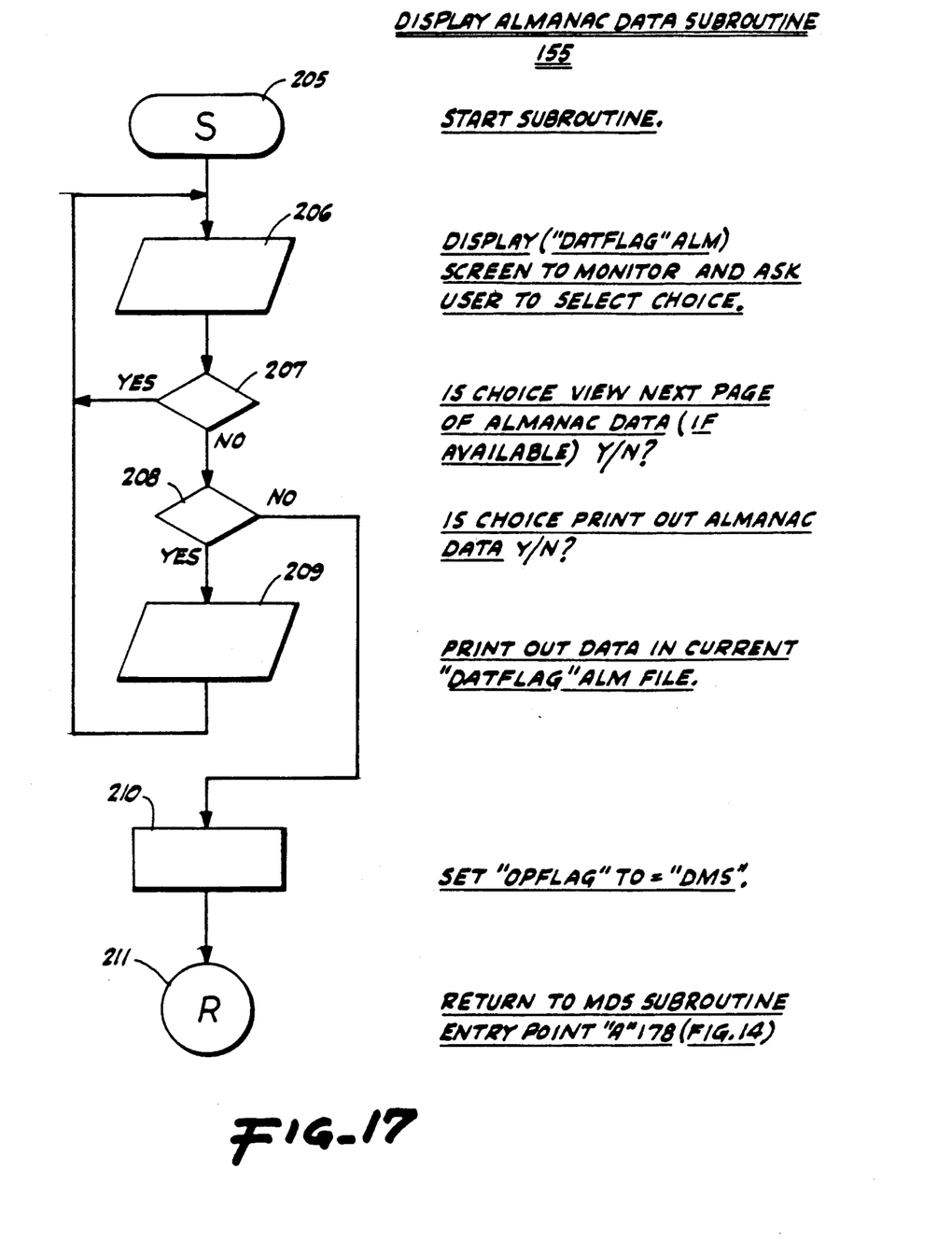

Specifically, FIGS. 12 through 17 depict, respectively, an overview of the system organization (FIG. 12); the Initialization Subroutine (FIG. 13); the Menu Driver Subroutine (FIG. 14); the Select Map Subroutine (FIG. 15); the Display Map Subroutine (FIG. 16); and the Display Almanac Data Subroutine (FIG. 17).

Figure 12:
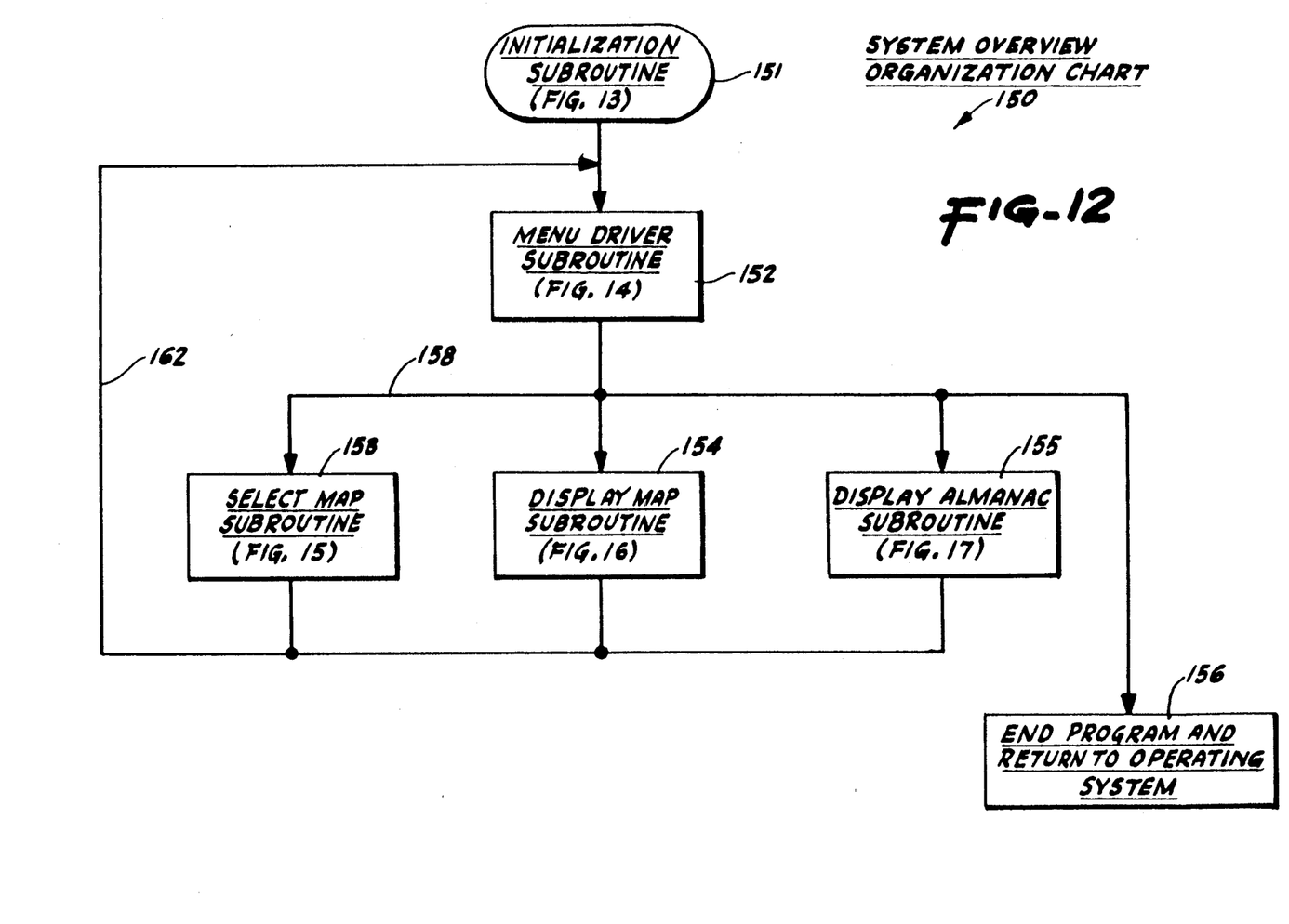

FIG. 12 - System Overview 150

Figure 13:
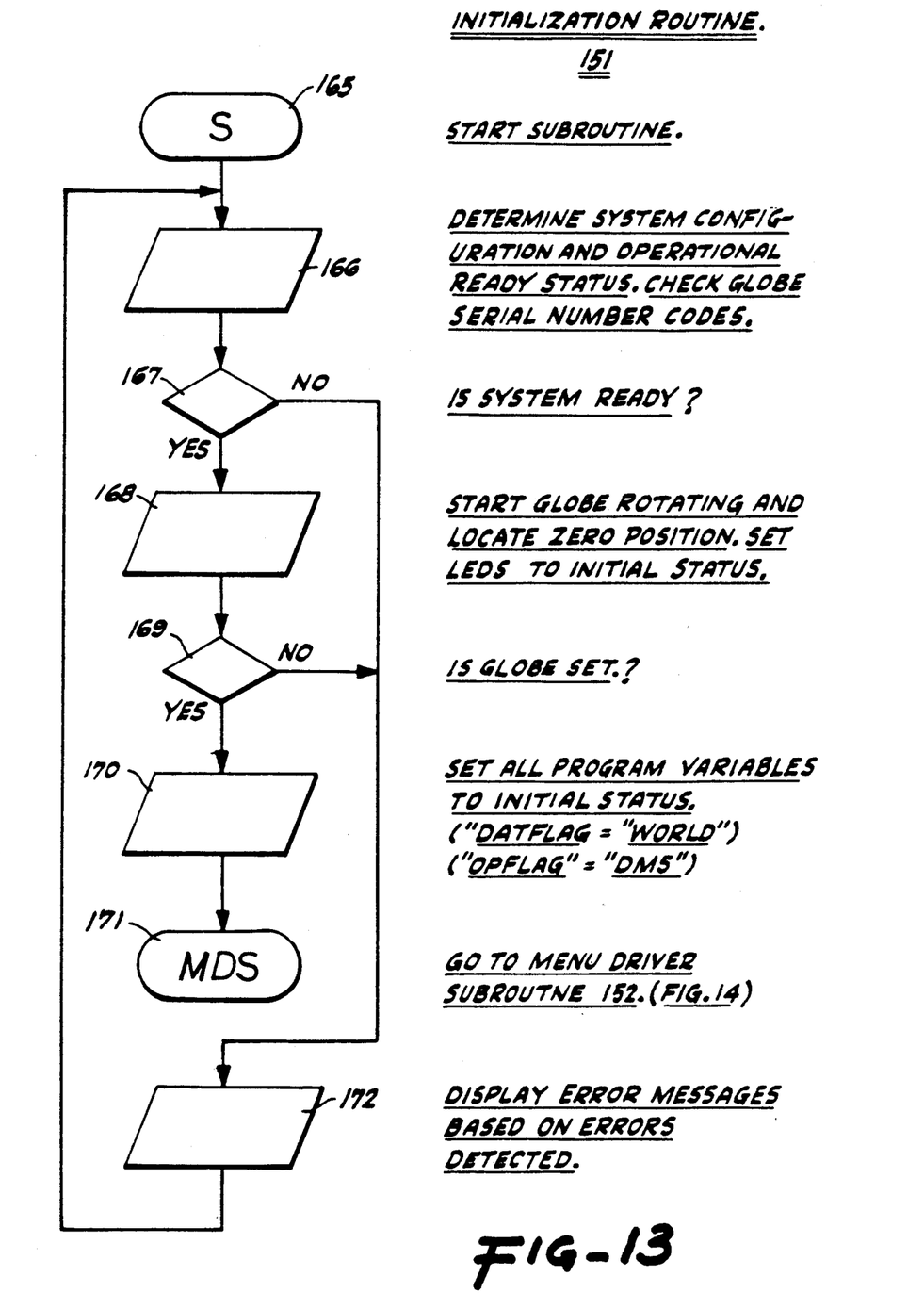

The program is begun with the Initialization Subroutine (INS) 151, FIG. 13. This subroutine determines the hardware system environment and sets up the operating parameters. Prior to exiting this subroutine to the Menu Driver Subroutine (MDS) 152, FIG. 14, the "DATFLAG" and "OPFLAG" program variables are set to instruct the program to display the world map to the screen and the globe.

The Menu Driver Subroutine 152, FIG. 14, enables the program to implement the functions to be performed and enters the appropriate subroutine to accomplish the desired activity. This subroutine serves as a "shell" that coordinates all program activity.

From the Menu Driver Subroutine 152, one of four alternatives is selected: the Select Map Subroutine 153 (FIG. 15), the Display Map Subroutine 154 (FIG. 16), the Display Almanac Subroutine 155 (FIG. 17), or, as indicated at 156, the program is ended and return is made to the operating system. From each of the Select Map, Display Map and Display Almanac Subroutines, the program may loop back to the Menu Driver Subroutine, as indicated by loop 162, for implementation of another of the three subroutines.

The Select Map Subroutine (SMD) 153, FIG. 15, is entered from the Menu Driver Subroutine if the user has chosen to select a map for display. On completion of this subroutine, the user is brought back to the Menu Driver Subroutine 152 to initiate the display of the selected map.

The Display Map Subroutine (DMS) 154, FIG. 16, serves as the output for all the display functions. This subroutine sets the screen map display, positions the globe 15, illuminates the LED's 58-58 and activates the speech synthesizer. The user also selects the various functions to be performed from this subroutine. The user's selection is assigned to an "OPFLAG" variable which is acted upon in the MDS subroutine 152. On completion of the DMS subroutine 154, the user is brought back to the Menu Driver Subroutine 152 to initiate the next function.

The Display Almanac Subroutine (DIS) 155, FIG. 17, is entered if the user has chosen to display almanac data such as the information contained in the "DATFLAG".ALM file associated with the map being displayed in the DMS subroutine 154. The user may view and/or print out stored almanac data from this subroutine. On completion of this subroutine, the user is brought back to the Menu Driver Subroutine 152 to initiate the next function.

Upon entering the end program and return to operating system subroutine 156, the program de-activates the globe display, clears the computer screen and enters the operating system.

FIG. 13 - Initialization Subroutine 151

After entry into this subroutine (as indicated by the terminal symbol designated 165), the program examines the operating environment (166) to determine: the type of monitor attached, whether the globe is attached, whether the globe power supply is turned on, whether the printer is attached and turned on, and the presence of whatever other devices are necessary for proper operation. Then (at 167), the question is, whether all of the above conditions are correct. If the answer is NO, the program drops through to 172.

If, instead, the above conditions are correct (YES), the program proceeds to 168, the globe drive motor 48 (FIGS. 2 and 11) is activated and begins to rotate the globe 15. The zero position switch (134, FIG. 11) is monitored to determine the zero position of the globe 15. When the globe 15 reaches the zero position, the program sets the motor position variable to zero. The LED's 58-58 (FIGS. 2 and 10) are all set flashing or are all turned on or flashed sequentially according to a predetermined initialization routine.

Then at 169, the questions are whether the globe is rotating, the position variable is zero, and the LED's are illuminated. If an error is detected (NO), the error code is passed to 172 to display error messages based on the errors detected, and the program branches to 166.

If, instead, all monitored systems are functioning properly (YES), the program proceeds to 170, where the two main program function variables are set to the appropriate values. The "DATFLAG" variable indicates the map is being examined and indicates the data files associated with the map. The "OPFLAG" variable represents the operation to be or being performed. As this subroutine is initializing the system, the "DATFLAG" is set to equal "WORLD" and will call up the "WORLD" map to the screen as the initial display. The "OPFLAG" is set to equal "DMS" which indicates that the function to be carried out by the Menu Driver Subroutine 152, FIG. 14, is to display a map.

After the program variables are set, the subroutine is finished, as indicated at 171, and the program branches to the Menu Driver Subroutine 152, FIG. 14.

FIG. 14 - Menu Driver Subroutine 152

Upon entry into the subroutine (175), the value of the "DATFLAG" variable is read (176), then the appropriate data files are accessed and loaded into the computer random access memory (177). These files include:

Map Screen Image (MSI) The data that actually holds the map image in file form that can be loaded directly into the video driver circuitry. This eliminates having to draw a screen image on a point-to-point basis.

ALManac data (ALM) - The screen images of the text appropriate for the almanac data of the selected map. The data may contain facts and information on many topics associated with each map.

VOCal data (VOC) - The data, in binary form, which contains the information needed for the voice synthesizer to generate a brief description of the map being displayed.

GLObe data (GLO) The data indicating the position of the globe and the appropriate LED's to be illuminated for each map.

After loading of the appropriate data files, the program drops to 179 where the "OPFLAG" (or operation flag) is read to determine the next operation to be performed. The flag is set in the INS subroutine 151, in the SMD subroutine 153 and in the DIS subroutine 155.

Then, at 180, the question is asked whether the "OPFLAG" has been set to "SMD". If YES, then the Select Map for Display Subroutine is entered (181). If NO, then the program falls through to 182 where the decision concerns whether the "OPFLAG" has been set to "DMS". If YES, then the Display Map Subroutine 154 is entered (183). If NO, then the program falls through to 184 where the decision concerns whether the "OPFLAG" has been set to "DIS". If YES, then the Display Almanac Data Subroutine 154 is entered (185). If NO, then the program falls through to 186 and returns to the operating system. In order for the program to reach this point, the "OPFLAG" will have been set to "EXIT". The Globe is turned off, and any changes that have been made to the computer for running the program are returned to normal. The display is cleared and control is passed to the operating system.

FIG. 15 - Select Map for Display Subroutine 153

Upon entry into the subroutine (190), the screen image files representing the maps likely to be chosen (the value of the "DATFLAG") are displayed as a list (191). For example, if the "DATFLAG" was set to "NAMER" for North America, the user would have choices of viewing the U.S.A. or Canada maps. If the flag was set to "EURO" for Europe, the user would be presented with the list of the countries in Europe in which to make his or her choice, and so on. The user is also able to scroll through the entire repertoire of map choice menus.

Then, after a specific map has been chosen (192) the "DATFLAG" is set to represent the map chosen for display and the "OPFLAG" is automatically set to DMS for Display Map Subroutine. Then, the subroutine is finished (193) and the program returns to the beginning of the Menu Driver Subroutine 152, FIG. 14.

FIG. 16 - Display Map Subroutine 154

Upon entry at 195, the "DATFLAG" GLO file is read for the motor position data required to rotate the globe 15 into the desired position (196). The globe position variable is checked to determine the present position of the globe. The two values are compared and the correct number of motor steps is calculated to determine how far the globe 15 must rotate (the direction of rotation may also be determined here). A control character is sent out on the RS-232 line that sets the address in the globe control electronics to receive the data that follows it. The program now sends out the "EXECUTE" command to the motor controller.

Next, the data file "DATFLAG" GLO is again read for the control data for the LED's 58 (197). The addresses for the desired LED's contain three characters: the bank address, the X-axis data and the Y-axis data. The first signal sent out tells the electronics which bank the LED's to be illuminated reside in. The row and column (x and y) data contain the actual information which determines whether a specific LED in the bank is on or off. The address data are followed by an "end of word marker". In this case, the "EXECUTE" command consists of the "end of word marker", which follows the address data previously sent.

The "DATFLAG" VOC file is then read (198) and the binary data which contains the voice synthesizer binary data is sent to the voice synthesis circuitry. After the data has been sent to the synthesis circuitry, an "EXECUTE" signal is sent to the circuit that tells it to "speak" and the message is begun.

Next, the "DATFLAG" MSI (Map Screen Image) file is loaded into the video buffer and displayed on the screen (199). The map is now displayed on the screen and globe. A small command line or block appears on the screen which lists the available user choices. The user can choose to select another map, display (and print) the almanac data for the present map or exit the program entirely. (A "queue" file could also exist that would enable the user to view prior maps. This file could contain a list of the "DATFLAG" values for previous maps in the order that they have been examined. The user could display the previous map by pressing one key that would cause the program to load the prior map.)

Finally (at 200), the "OPFLAG" variable is set to reflect the user's choice, the subroutine is finished (at 201) and the program returns to the Menu Driver Subroutine 152, at entry point 178, FIG. 14.

FIG. 17 - Display Almanac Data Subroutine 155

Initially (at 206), the screen image file containing the text of the almanac data which is pertinent to the presently chosen map ("DATFLAG" value) is loaded on the screen. If there is more than one page of data in this text record, the user is asked if it is desired to view the next page. The user is also asked if it is desired to print out the almanac data. Then (at 207), the question is asked whether the user is chosen to view the next page. If YES, then the program returns to 206 to display the next page. If NO, then the program drops through to (208) where the question is whether the user has chosen to print out the data record. If YES, then the program implements printing of the record (at 209), then branches back to 206. If NO, then the program branches down to 210 where the "OPFLAG" is automatically set to "DMS" (Display Map Subroutine 154), which will put the current map on the screen as the next operation. Then (at 211), the subroutine is finished and the program returns to the Menu Driver Subroutine 152 at entry point 178, FIG. 14, to perform the next operation.

Calculation (CAL) Program Module

The driver program for the computerized Globe Almanac can offer the user the capability of performing some geographical or cartographic calculations by incorporating a "Calculation" module or modules into the main program. The module(s) can be accessed by the user from the DIS (Display Almanac Data) Subroutine 155, FIG. 17. This access function is handled by the program in the same manner as is currently used to choose printing out almanac data at 208 and 209, FIG. 17.

The calculation module, when brought up, would ask the user which function it is desired to use. For example, the choice would be:
1) Calculate the Rhumb line (Great Circle Distance) between two major cities;
2) Calculate the Rhumb line between two points (entered as latitude and longitude coordinates); or
3) Calculate the highway mileage between two major cities.

The program draws upon a series of data files containing a list of major cities with their latitude and longitude coordinates and a city identification number.

The latitude and longitude coordinates are used for Rhumb line calculation in a conventional cartographic or geodetic algorithm. The complexity of the algorithm chosen for this function can vary as to the degree of accuracy desired. For example, the algorithm can be a simple algorithm using a fixed earth radius at sea level, a more complex algorithm incorporating a variable radius value to compensate for altitude of the coordinates, or a highly complex algorithm that would compensate for the flattening of the earth in the polar regions in addition to altitude differences.

The identification number assigned to each city serves as either an abcissa or ordinate to access a value representing the highway mileage between the two cities. These values are stored in a two-dimensional array, similar to the (x,y) mileage charts found in many highway maps.

The results of the calculations performed can be displayed on the screen or printed out in report form as desired.

Thus, there has been described a computer-driven globe almanac display which rotates the globe to a selected point for viewing, selectively illuminates points or areas of the globe without cross-illumination of adjacent areas and displays and/or prints related information concerning the selected point or areas. For example, such information includes, but is not limited to, the name and population of a city or capitol city; the name and length of a river; and the name, population, capital city, major religion, governing political system, etc., of a country. Of course, given the mechanical construction and operation of the globe and the associated operating computer program, the type of almanac information which is displayed and printed can be as lengthy or as varied as desired.

Those of usual skill in the art will readily derive alternative as well as different embodiments of the above-described computer-controlled globe almanac invention as well as modifications thereof which are within the scope of the invention defined by the appended claims. For example, but not by way of limitation, the above invention is equally applicable to navigational maps and to celestial maps.

Having thus described preferred and numerous alternative embodiments of our present computer controlled almanac globe system, what is claimed is:

1. A computer controlled globe almanac comprising:
   a globe having an outer surface;
   means for rotating the globe to a selected viewing orientation relative to a viewer;
   inserts attached to the globe outer surface via holes therein, said inserts defining regions and points corresponding to selected geographic and political features;
   at least one illumination source, said illumination source optically coupled to a selected one of the inserts via one of said holes for internally illuminating said selected insert;
   an optical light pipe means between said illumination source and said selected insert comprising an opaque cylinder in said one hole and a light pipe in said cylinder, for channeling light from said illumination source to said selected insert;
   computer means controlling the rotating means to effect rotation of the globe to the selected viewing orientation and controlling activation of the illumination source to illuminate selected points and regions; and
   the globe being mounted on a base housing, said base housing including power and control wiring for the globe rotation means and illumination source, said globe further comprising:
   a shaft having one end mounted to the base housing and a second end extending into the globe for mounting the globe and routing said wiring into the globe;
   a mounting plate mounted internally within the globe co-axially with said shaft;
   said globe rotation means including a motor mounted on said mounting plate and adapted for rotating the globe about said shaft; and p1 a slip ring assembly mounted on the second end of said shaft and to the mounting plate for connecting said wiring to said illumination source and said rotating means.

2. The computer controlled globe almanac of claim 1, wherein the globe surface comprises depressed areas for receiving said inserts, said selected insert including a hollow post having said optical light pipe means therein, said post being inserted into said hole to mount said insert to the globe.

3. The computer-controlled globe almanac of claim 1, wherein the said inserts are removable so that the globe information, such as the name and boundaries of countries, is changeable.

4. The computer-controlled globe almanac of claim 1, wherein the globe surface and associated inserts and points correspond to features selected from one of navigational maps and celestial maps.

5. The computer-controlled globe almanac system of claim 1, said computer means being programmed for displaying selected almanac information corresponding to the selected points and regions.

6. A computer-controlled globe almanac of, comprising:
   a globe having an outer surface;
   means for rotating the globe to a selected viewing orientation relative to a viewer;
   inserts attached to the globe outer surface via holes therein, said inserts defining regions and points corresponding to selected geographical and political features;
   at least one illumination source, said illumination source optically coupled to a selected one of the inserts via one of said holes for internally illuminating said selected insert;
   an optical light pipe means between said illumination source and said selected insert comprising an opaque cylinder in said one hole and a light pipe in said cylinder, for channeling light from said illumination source to said selected insert;
   computer means controlling the rotating means to effect rotation of the globe to the selected viewing orientation and controlling activation of the illumination source to illuminate selected points and regions; and
   a base housing including power and control wiring for the globe rotation means and illumination source; a shaft having one end mounted to the base housing and a second end extending into the globe for mounting the globe;
   a stationary mounted plate mounted internally within the globe co-axially with said shaft;
   said globe rotation means including a motor mounted on said stationary mounting plate and adapted for rotating the globe about the shaft;
   a slip ring assembly mounted on the second end of the shaft and to the mounting plate; and
   wiring means routed between the base housing the globe for supplying power and control leads to the motor and illumination source, said wiring means comprising a first wiring section routed from the base housing through the shaft to the slip ring assembly; a second section connected between the slip ring assembly and the mounting plate; and a third section connected between the mounting plate and the at least one source of illumination and the motor, whereby a stationary route is provided for said wiring means within the rotational globe.

* * * * *